US006253348B1

(12) United States Patent
Davidsson et al.

(10) Patent No.: US 6,253,348 B1
(45) Date of Patent: Jun. 26, 2001

(54) HARDWARE DESIGN FOR MAJORITY VOTING, AND TESTING AND MAINTENANCE OF MAJORITY VOTING

(75) Inventors: Stefan Hans Bertil Davidsson, Skärholmen; Ola Per Martinsson, Huddinge; Carl Michael Carlsson, Årsta, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/545,863

(22) Filed: Apr. 7, 2000

Related U.S. Application Data

(62) Division of application No. 09/090,411, filed on Jun. 4, 1998.

(30) Foreign Application Priority Data

Jun. 6, 1997 (SE) .................................................. 9702176

(51) Int. Cl.[7] .................................................. G06F 11/08
(52) U.S. Cl. ............................................. 714/797; 326/35
(58) Field of Search .................................... 714/724, 797, 714/746; 326/35

(56) References Cited

U.S. PATENT DOCUMENTS

| 4,433,413 | * | 2/1984 | Fasang ................................. 714/732 |
| 4,583,224 | * | 4/1986 | Ishii et al. ............................. 714/10 |
| 4,683,570 | | 7/1987 | Bedard et al. ........................ 714/797 |
| 4,742,334 | | 5/1988 | Teich et al. .......................... 340/505 |

(List continued on next page.)

FOREIGN PATENT DOCUMENTS 0 344 426  12/1989 (EP) .............................. G06F/11/18

OTHER PUBLICATIONS

Kyeongho et al. (A CMOS serial link for fully duplexed data communication; IEEE, Apr. 1995).*
Gersting et al. (A comparison of voting algorithms for n–version programming; IEEE, 1991).*
Blough et al. (Fault diagnosis for sparsely interconnected multiprocessor systems; IEEE, 1989).*

(List continued on next page.)

*Primary Examiner*—Albert Decady
*Assistant Examiner*—Guy Lamarre
(74) *Attorney, Agent, or Firm*—Burns, Doane, Swecker & Mathis, L.L.P.

(57) ABSTRACT

The invention relates to majority voting testing. A number of input signals are monitored individually by separate monitors, one monitor for each signal. Each monitor generates a control signal representing the status of the monitored signal. The generated control signals are sent to a level control unit. The level control unit controls the input levels to a majority voter according to the control signals. Instead of signals that are faulty, the level control unit selects signals of specific logical levels to be forwarded to the majority logic. The logical levels of these so called replacement signals are selected such that the replacement signals do not interfere with the remaining correct signals. Furthermore, the majority voted output signal is monitored so as to selectively generate an alarm. The voting functionality is tested by stopping input signals according to a first procedure, thus generating an alarm. By stopping input signals according to a second procedure, an alarm is avoided.

6 Claims, 10 Drawing Sheets

U.S. PATENT DOCUMENTS

| | | | |
|---|---|---|---|
| 4,839,855 | | 6/1989 | Van Driel .............................. 714/797 |
| 5,014,226 | * | 5/1991 | Horstmann et al. ............ 395/500.05 |
| 5,127,008 | * | 6/1992 | Bassett et al. ........................ 714/726 |
| 5,159,598 | | 10/1992 | Wells, II et al. ..................... 714/797 |
| 5,305,325 | | 4/1994 | Roos ..................................... 714/703 |
| 5,430,740 | * | 7/1995 | Kivari et al. .......................... 714/782 |
| 5,498,912 | * | 3/1996 | Templeman et al. ................. 307/115 |
| 5,526,288 | | 6/1996 | Sacks et al. .......................... 702/122 |
| 5,537,583 | | 7/1996 | Truong ................................. 713/500 |
| 5,568,097 | | 10/1996 | Woodman, Jr. .......................... 331/2 |
| 5,732,209 | * | 3/1998 | Vigil et al. ............................. 714/30 |
| 5,859,996 | | 1/1999 | Dryer et al. .......................... 713/501 |
| 5,862,315 | * | 1/1999 | Glaser et al. ................... 395/182.09 |
| 5,864,657 | | 1/1999 | Stiffler ................................... 714/15 |
| 5,948,116 | | 9/1999 | Aslanidis et al. ..................... 714/797 |
| 5,970,226 | | 10/1999 | Hoy et al. .............................. 714/25 |

OTHER PUBLICATIONS

Stroud, et al. Design for Testability and Test Generation for Static Redundancy System Level Fault Tolerant Circuits. IEEE, 1989.

Shin, et al. Alternative Majority–Voting Methods for Real–Time Computing Systems. IEEE, 1989.

Stroud. Reliability of Majority Voting Based on VLSI Fault Tolerant Circuits. IEEE, 1994.

Hingston, et al. Development of a Digital Excitation Control System. IEEE, 1989.

* cited by examiner

HARDWARE DESIGN FOR MAJORITY VOTING, AND TESTING AND MAINTENANCE OF MAJORITY VOTING

This application is a divisional of Ser. No. 09/090,411 Jun. 4, 1998.

BACKGROUND

The present invention generally relates to majority voting of signals, and in particular to a majority voting circuit, and also to testing and maintenance of majority voting.

Majority voting is frequently utilized in a wide variety of technical applications in many technical fields. In particular, majority voting is of great importance in fault tolerant or redundant systems. Examples of such systems are clock generating systems and data processing systems.

In general, a majority voting circuit accepts a plurality of logical input signals to generate a logical output signal that is representative of the majority vote of the input signals. In the case of three input signals, the majority vote is generally performed according to the following simple Boolean expression: (A AND B) OR (A AND C) OR (B AND C), where A, B and C represent the logical levels of the signals that are input to the majority voting circuit. If all three input signals are present, the majority voting circuit sets the majority voted output signal to a high level if a majority of the three incoming signals are at high level, otherwise the output signal will be set to a low level. In the case of a single faulty input signal, the majority voting circuit will still be able to generate a correct output signal.

However, conventional majority voting circuits have problems in effectively handling more than one faulty input signal; especially when the input signals are periodic.

U.S. Pat. No. 4,583,224 issued to Ishii et al. on Apr. 15, 1986 relates to redundancy control, and in particular to fault tolerable redundancy control using majority vote logic. There is disclosed a redundant control system in which three control signals from three equivalent signal processors are subjected to a majority vote operation in order to generate a single majority voted control signal. The majority voted control signal is used for controlling an apparatus or system such as an atomic power plant. The control signals are compared to each other, and if one of the control signals differs from the other control signals, then the different control signal is considered as abnormal and an error detection signal, corresponding to the abnormal signal, is generated. There is also provided means for generating a set signal of a predetermined level, "0" or "1". A switching device receives the control signals, the error detection signal and the set signal for forwarding the control signals that are not associated with the error detection signal to a majority logic circuit, and for forwarding the set signal to the majority logic circuit instead of the abnormal control signal. When one of the three inputs to the majority logic is fixed to have the set level of "1", the logic circuit is equivalent to an OR gate applied with the remaining inputs. On the other hand, when one of the three inputs is fixed to have the set level of "0", the logic circuit is equivalent to an AND gate applied with the remaining inputs.

Apparently, the control system in U.S. Pat. No. 4,583,224 is customized for static signals, and fail-safe control operation can be continued after the occurrence of faults in two of the three control channels only by previously determining which logical level "0" or "1" that is to be substituted for the abnormal control signal.

SUMMARY

It is a general object of the invention to provide an improved and robust hardware design for majority voting of signals.

In particular, it is an object to provide circuitry which controls the majority voting and which corrects for faulty input signals. The majority voting must work such that a well defined and correct output signal is generated no matter if one or more input signals are faulty. If, as an example, majority voting is performed on dynamic or periodic signals such as clock signals, and one or more of the clock signals have stopped, then a correct output clock should be generated no matter if the input clock signals have stopped at a high or low logical level.

A further object is to provide a clock generating system and a corresponding method based on the improved majority vote hardware design.

Still another object of the invention is to enable testing and maintenance of majority voting. To this end, majority vote test and maintenance methods as well as corresponding devices are provided. For maintenance reasons, it is desirable to be able to check that the majority voting functionality is actually working, without causing disturbances in the system.

These and other objects are solved by the invention as defined below.

The invention offers the following advantages:

A robust majority vote functionality;

The system, such as a clock system in a telecommunication switch, in which the majority vote logic is used becomes less sensitive to disturbances or malfunctions;

Maintenance tests can be performed without causing disturbances, which in turn means that this kind of testing can be made much more often, even on a routine basis; and Improved reliability and service availability.

Other advantages offered by the present invention will be appreciated upon reading of the below description of the embodiments of the invention.

BRIEF DESCRIPTION OF THE DRAWINGS

The novel features believed characteristic of the invention are set forth below. The invention itself, however, as well as other features and advantages thereof will be best understood by reference to the detailed description of the specific embodiments which follows, when read in conjunction with the accompanying drawings, wherein.

DETAILED DESCRIPTION

Figure 1:
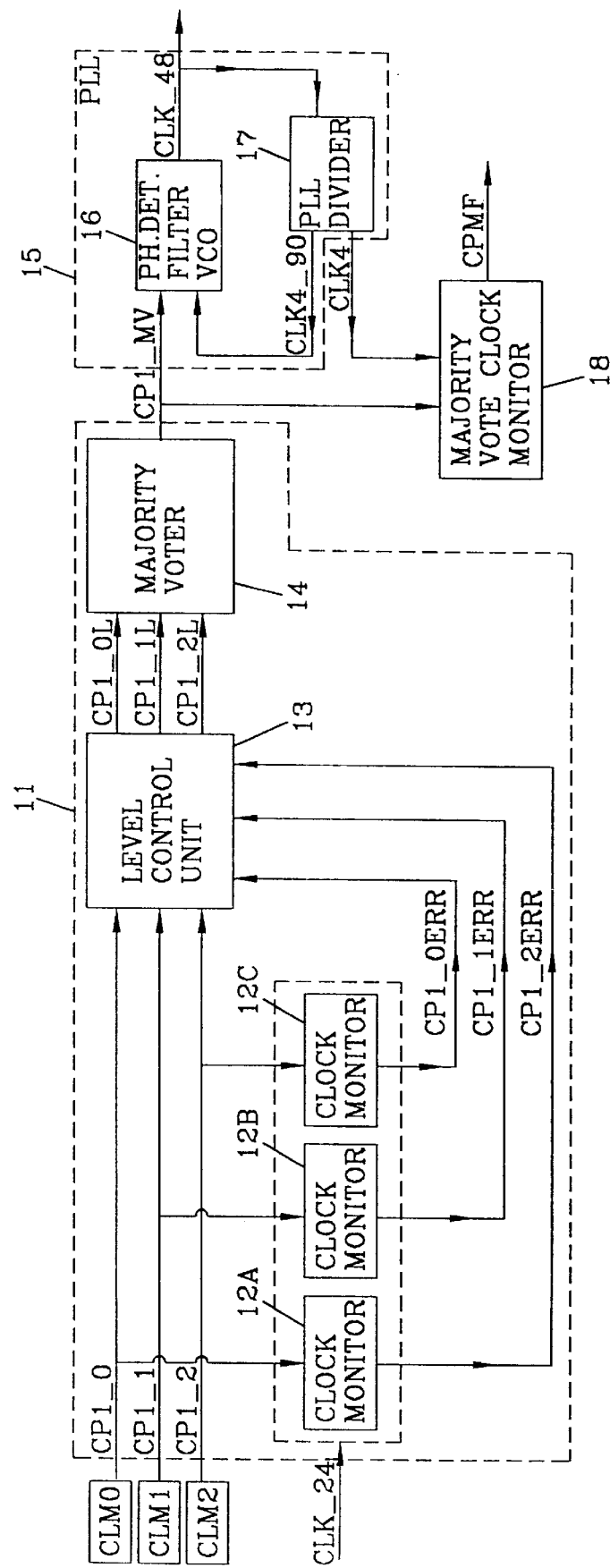
FIG. 1 is a schematic circuit diagram illustrating pertinent parts of the overall clock system in a switch integrated circuit according to the invention.

In general, as mentioned above, majority voting is applicable in many fields of technology, and to different types of input signals. In the following however, the invention will be described with reference to an illustrative example. In addition, the invention will be explained in relation to a specific technical application, namely a clock and synchronization signal generating system in a telecommunication switch. Of course, it should be understood that the invention is not limited to this particular example.

A telecommunication switch normally includes a clock generating system which provides the circuits in the switch with clock and synchronization signals. To meet requirements on safety and reliability, the clock generating system is normally redundant. Redundancy in the clock generating system is ensured by using multiple clock generating units. In other words, the clock generating unit is manifolded, usually duplicated or triplicated. These clock generating units are also referred to as clock modules. Assume by way of example that there are three independent clock modules in a telecommunication switch. Each clock module generates a clock signal and a lower frequency synchronization signal. It is usually desirable to make a main clock signal and a main synchronization signal out of the three clock signals and the three synchronization signals. For this purpose it is appropriate to use majority vote logic.

Since the idea according to the invention is basically the same for clock signals and synchronization signals, the invention will mainly be described with regard to majority voting of clock signals.

In the following, when a 4 MHz clock signal is mentioned, it actually means a clock signal of 4.096 MHz. In the same manner, a 24 MHz clock signal means a clock signal of 24.576 MHz, and a 48 MHz clock signal means a clock signal of 49.152 MHz.

Throughout the disclosure, the term "flip-flop" will designate a conventional data flip-flop.

In the figures, the notation SIGNAL [x:0] (where x is a positive integer) indicates a signal of x+1 bits.

An improved hardware design for majority voting

A first aspect of the invention relates to an improved and robust hardware design for majority voting. Before describing the first aspect of the invention in detail, the general idea of the improved hardware design will now be explained briefly. In accordance with the invention, the clock signals coming from the clock modules are monitored individually by separate clock monitors, one clock monitor for each clock signal, to see if the clock signals are running normally or not. Each clock monitor detects if its corresponding clock signal has stopped or not, and generates a control signal which is representative of the status of the monitored clock signal. As an example, a control signal having the logical level of "1" represents a stopped or otherwise faulty clock signal, whereas a control signal having the logical level of "0" represents a correct and well-defined clock signal. The generated control signals are sent to a level control unit. The level control unit control the input levels to a majority voter in accordance with the control signals. Instead of clock signals that have stopped toggling, the level control unit selects signals of specific logical levels to be forwarded to the majority logic. The specific logical levels of these so called replacement signals are selected such that the replacement signals do not interfere with the remaining correct clock signals. In this way, the majority vote will still function even if more than one clock signal stops.

The level control unit corrects for faulty clock signals before the actual majority vote operation is performed by the majority voter, and in this sense, the improved majority vote hardware design is pre-corrective.

A clear advantage of the improved majority voting circuit according to the invention is that it is capable of handling two stopped clock signals no matter if the clock signals have stopped at a high or low logical level. In this regard, the inventive majority voting circuit is customized for dynamic or periodic input signals, such as clock and synchronization signals.

For a better understanding of the invention, the majority voting hardware design will now be described in more detail with reference to an illustrative example. In the following it is assumed that there are three clock modules in the switch, each of which generates a clock signal.

FIG. 1 is a schematic circuit diagram illustrating pertinent parts of an overall redundant clock generating system in a switch integrated circuit according to an illustrative embodiment of the invention. The system basically comprises three clock modules CLM0, CLM1, CLM2, three clock monitors 12A–C, a level control unit 13, a majority voter 14 performing a majority vote operation, a phase-locked loop (PLL) 15 and a majority vote clock monitor 18. The clock modules CLM0, CLM1 and CLM2 generate the clock signals CP1_0, CP1_1 and CP1_2, respectively. In general, the clock monitors 12A–C are loss-of-signal detectors. Each one of the clock monitors 12A–C detects if the corresponding incoming clock signal is present or not and sets its output control signal CP1_xERR (x is 0, 1 or 2 accordingly. By way of example, if an incoming clock signal CP1_x has stopped, the corresponding control signal CP1_xERR is set to a high logical level, whereas if the clock signal CP1_x is toggling correctly, the control signal CP1_xERR is set to a low logical level. The control signals CP1_0ERR, CP1_1ERR and CP1_2ERR from the clock monitors 12A–C are sent to the level control unit 13 which also receives the clock signals CP1_0, CP1_1 and CP1_2. The level control unit 13 controls the input levels to the majority voter 14, and the level control is performed in accordance with the control signals CP1_0ERR, CP1_1ERR and CP1_2ERR. If all the incoming clock signals CP1_0, CP1_1 and CP1_2 are correct and well-defined, the clock monitors 12A–C will set their control signals such that the level control unit 13 becomes transparent, and consequently the clock signals are distributed to the majority voter 14 without level adjustment. However, if one or two clock signals have stopped, the level control unit 13 will force the clock signal or signals in question to a low or high logical level depending upon the particular failure situation. By way of example, if two clock signals are detected as faulty, the level control unit 13 is set to lock these faulty clock signals to different logical levels such that they do not interfere with the remaining clock signal when doing the majority vote. The majority voter 14 performs a conventional majority voting operation on the signals CP1_0L, CP1_1L, CP1_2L that are sent into the voter 14 from the level control unit 13. Accordingly, the voter 14 generates a single majority voted output clock signal CP1_MV.

The clock monitors 12A–C, the level control unit 13 and the majority voter 14 constitute the main core, designated by reference numeral 11 in FIG. 1, of the improved majority vote hardware design according to the invention.

In this particular example, the majority voting circuit is utilized in a clock generating system, and the majority voted clock signal CP1_MV is sent to a phase-locked loop (PLL) 15 which generates a higher frequency clock signal CLK_48. As an example, the majority voted clock CP1_MV has a frequency of 4 MHz, and the PLL output clock CLK_48 has a frequency of 48 MHz. The CLK_48 clock signal is advantageously used as system clock signal for the circuits of the switch, and as such passed to a clock distribution circuit (not shown) which provides the circuits in the switch with a system clock signal.

The phase locked loop (PLL) 15 preferably comprises a PLL output signal generating unit 16, and a feedback loop with a PLL frequency divider 17. The PLL output signal generating unit 16 includes a phase detector, a filter and a voltage controlled oscillator (VCO). The resulting majority voted main clock signal CP1_MV from the majority voter 14 is sent to the phase locked-loop 15, and the phase of the resulting main clock signal CP1_MV is used as a reference in the phase-locked loop 15. For this reason the clock signal paths from the clock modules (not shown) to the phase-locked loop 15 are preferably combinatorial, such that there are no flip-flops in the clock signal paths. Because the PLL 15 raises the frequency from 4 to 48 MHz in this example, the PLL frequency divider 17 is required in the feedback loop in order to get a feedback signal CLK4_90 of the same frequency as the input reference signal CP1_MV. The VCO generates a 48 MHz clock and this clock is divided by 12 in the frequency divider 17. The phase relation between the majority voted clock signal CP1_MV and the feedback clock signal CLK4_90 is compared in the phase detector, and the filter generates a control voltage in response to this comparison. The generated control voltage is used for regulating the frequency of the VCO.

The PLL 15 is provided in the system for several reasons. The VCO in the PLL 15 raises the frequency by a factor of 12. The PLL 15 also makes sure that the CLK_48 clock is phase synchronous to the majority voted clock CP1_MV, and the PLL 15 will continue running properly for a short period of time even if all input clock signals stop toggling. Other advantages of the phase-locked loop 15 will be described below.

The majority vote clock monitor 18 is not considered necessary for explaining the majority vote hardware design aspect of the invention. However, we will return to the majority vote clock monitor 18 later in connection with the majority vote supervision function.

Figure 2:
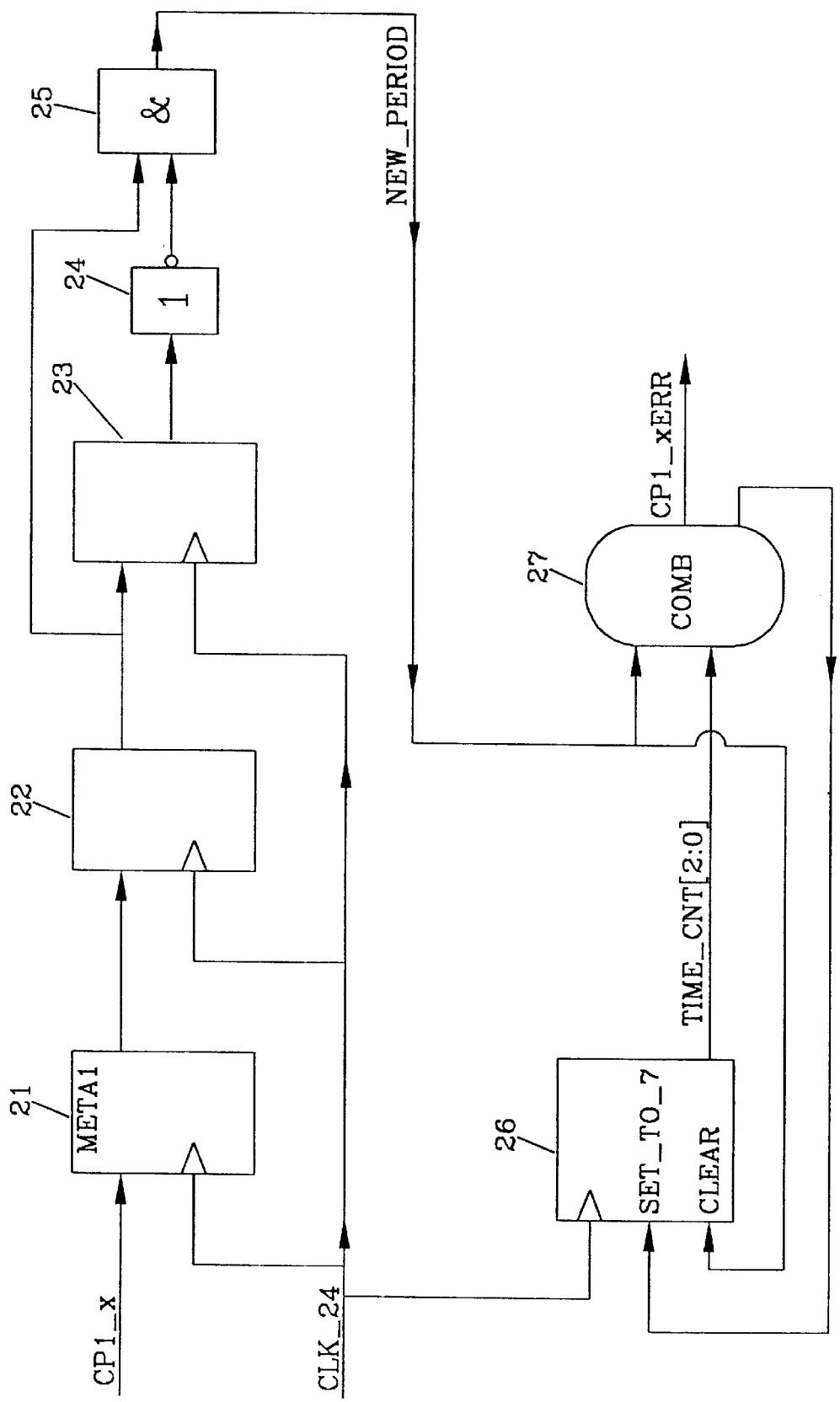
FIG. 2 is a schematic circuit diagram of a clock monitor according to the invention.

FIG. 2 is a schematic circuit diagram of an illustrative clock monitor according to the invention. The clock monitor of FIG. 2 is designed to react if the monitored clock signal CP1_x does not toggle for a predetermined detection time. If a predetermined number, such as three for example, of consecutive clock pulses are absent in the monitored clock signal CP1_x, the corresponding CP1_xERR control bit is set high. As an example, the monitor measures the period time of the incoming clock signal CP1_x in terms of 24 MHz clock pulses. If the period time is too short or too long, the monitor sets the control bit. The clock monitor comprises a meta stability protection flip-flop, also referred to as META1 flip-flop 21, two other flip-flops 22, 23, an inverter 24, an AND-gate 25, a 3-bit period time counter 26, and a combinatorial network 27.

A 24 MHz clock signal CLK_24 is provided to the flip-flops 21, 22, 23, and the period time counter 26. The incoming clock signal CP1_x is clocked into the META1 flip-flop 21, which protects against meta stability, as the relation between the CP1_x clock and the CLK_24 clock is asynchronous. Then, the clock is passed through two additional flip-flops 22, 23, which with the inverter 24 and the AND-gate 25 generates a positive pulse NEW_PERIOD every time the CP1_x clock signal goes high. The NEW_PERIOD signal is utilized to clear the 3-bit counter 26. The counter 26 generates a TIME_CNT counter value which represents the period time of the CP1_x signal in terms of 24 MHz clock pulses. When NEW_PERIOD is high, the counter 26 is cleared such that the counter 26 starts making a new count. The counter 26 counts the number of CLK_24 clock cycles, until the next time NEW_PERIOD goes high. At that time, the TIME_CNT counter value is examined by the combinatorial network 27. The NEW_PERIOD signal and the TIME_CNT signal are sent into the combinatorial network 27, and the combinatorial logic decides whether or not the control bit shall be set based on these signals. By way of example, the combinatorial network 27 is implemented by using the known programming language VERILOG and the known synthesizing program SYNOPSYS. The functionality of the combinatorial network 27 is defined in a program written in VERILOG, and the synthesizing program SYNOPSYS transforms the VERILOG program into a hardware network of gates and flip-flops. The period time represented by the TIME_CNT signal is approved by the combinatorial logic if the counter value TIME_CNT of the counter 26 is 4, 5, or 6 when NEW_PERIOD is high. If the period time is approved, then the control signal CP1_xERR is set low. If however, the TIME_CNT counter value is less than 4 or greater than 6 when NEW_PERIOD goes high, the period time is faulty and the CP1_xERR signal is set high. If NEW_PERIOD has not become high before the counter 26 reaches the counter value of 7, the counter 26 stops at this value.

Figure 3:
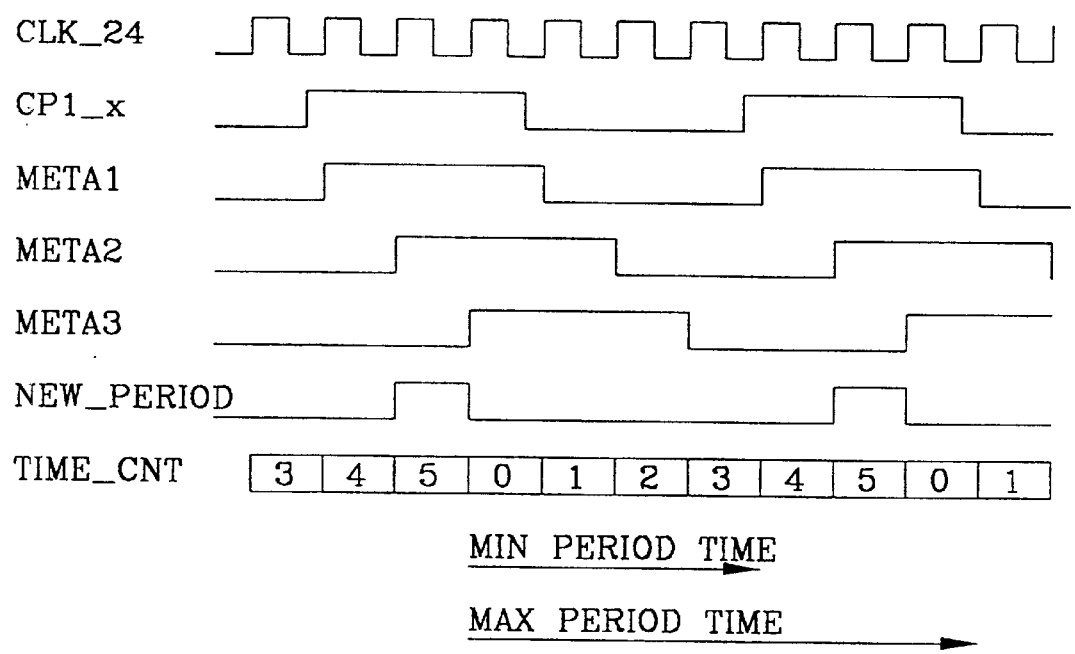
FIG. 3 is a schematic timing diagram of signals involved in the operation of the clock monitor of FIG. 2.

FIG. 3 is a schematic timing diagram of signals involved in the operation of the clock monitor of FIG. 2.

Figure 4:
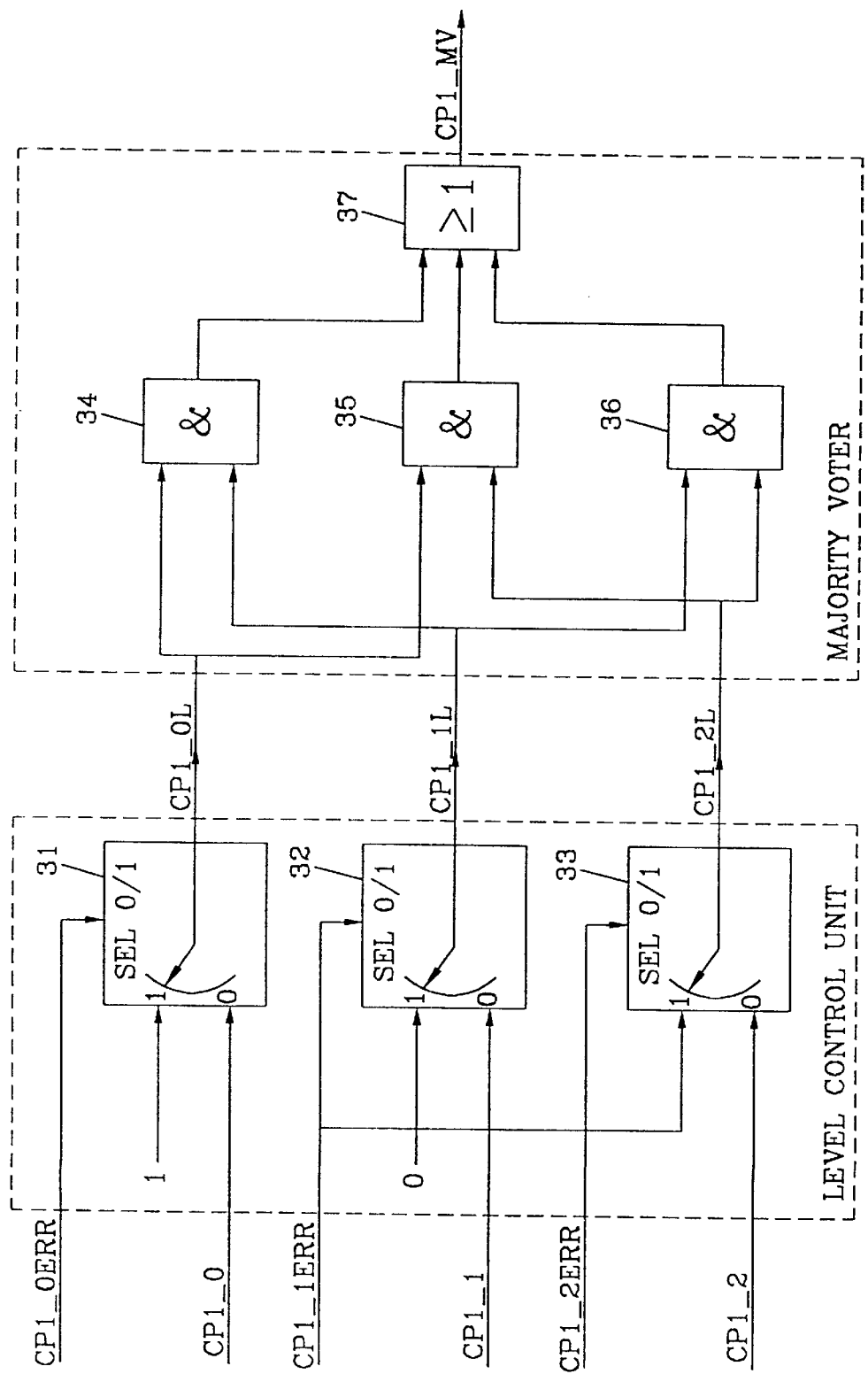
FIG. 4 is a schematic circuit diagram of a level control unit and a majority voter according to the invention.

FIG. 4 is a schematic circuit diagram of a level control unit and a majority voter according to the invention. The level control unit 13 (FIG. 1) basically comprises three signal selectors (switches) 31, 32, 33, each having two input terminals for receiving input signals, a control terminal for receiving a respective one of the control signals CP1_xERR (x is 0, 1 or 2) from the clock monitors 12A–C and an output terminal for outputting one of the two input signals as a selector output signal CP1_xL (x is 0, 1 or 2). Each selector receives a respective one of the clock signals CP1_x (x is 0, 1 or 2) at one of its two input terminals, and a constant level signal at the other input terminal. According to an illustrative embodiment of the invention, two of the constant level signals are set to opposite logical levels; "0" and "1". As an example, the "0"-terminal is connected to ground, and the "1"-terminal is connected to the positive logic supply rail. The selector 31 that is responsive to the clock signal CP1_0 receives the constant level signal "1", and the selector 32 that is responsive to the clock signal CP1_1 receives the constant level signal "0". The selector 33 that is responsive to the CP1_2 clock signal, receives the CP1_1ERR control signal, at its other input terminal. The control signal CP1_1ERR may have a low or a high level, but in each particular failure situation the CP1_1ERR signal is either low or high, thus acting as a constant level signal at that time. The level control unit 13 receives information, in the form of the control signals CP1_0ERR, CP1_1ERR, CP1_2ERR from the clock monitors 12A–C concerning the status of the input clock signals. Which one of the two input signals that will be selected as selector output signal CP1_xL for each one of the selectors 31, 32, 33 is controlled by the corresponding control signal CP1_xERR. The functional operation of the level control unit 13 can be summarized as follows:

If the incoming clock signal CP1_0 has stopped toggling, the level control unit sets the output signal CP1_0L to a high level;

If the incoming clock signal CP1_1 has stopped toggling, the level control unit sets the output signal CP1_1L to a low level; and If the incoming clock signal CP1_2 has stopped toggling, the level control unit sets the output signal CP1_2L to be CP1_1 ERR.

The selector output signals CP1_0L, CP1_1L and CP1_2L of the level control unit 13 are sent to the majority voter 14. The majority voter 14 is a conventional unit which performs a majority voting operation on its input signals by means of simple AND-gates 34, 35, 36 and an OR-gate 37, thus producing a majority voted output signal CP1_MV.

In practice, the combination of the individual clock monitors 12A–C, the level control unit 13 and the majority voter 14 means that if one of the incoming clocks stops, the level control unit 13 sets the majority voter input levels such that the remaining two clocks are generally AND:ed together. If one more clock stops, the level control unit 13 sets the input levels to the majority voter 14 such that the output signals of the selectors that are associated with the clock signals that have stopped toggling, do not interfere with the remaining clock signal. In this way the remaining clock signal will be put through as the majority voted output clock signal CP1_MV.

The above suggested implementation gives rise to a faulty behavior in one single case; if the CP1_0 clock signal stops. Then the remaining two clock signals will be OR:ed together instead of AND:ed together. This will cause a small phase jump in the resulting majority voted main clock signal. This kind of phase jump is however encountered in all systems that use the above type of majority vote operation, (A AND B) OR (A AND C) OR (B AND C), and is normally not regarded as a problem. The magnitude of the phase jump depends on the skew between the remaining input clock signals, and it lies well within the safety margins of the system. In addition, the phase-locked loop 15 (FIG. 1) which is connected to receive the majority voted output clock CP1_MV will transform the phase jump into a smooth transient.

The above majority vote control circuitry basically ensures that the majority voting functionality will still work even if two out of three clock signals stop. The whole clock system in the switch becomes less sensitive to disturbances or malfunctions, which in turn leads to higher reliability and service availability.

Figure 5:
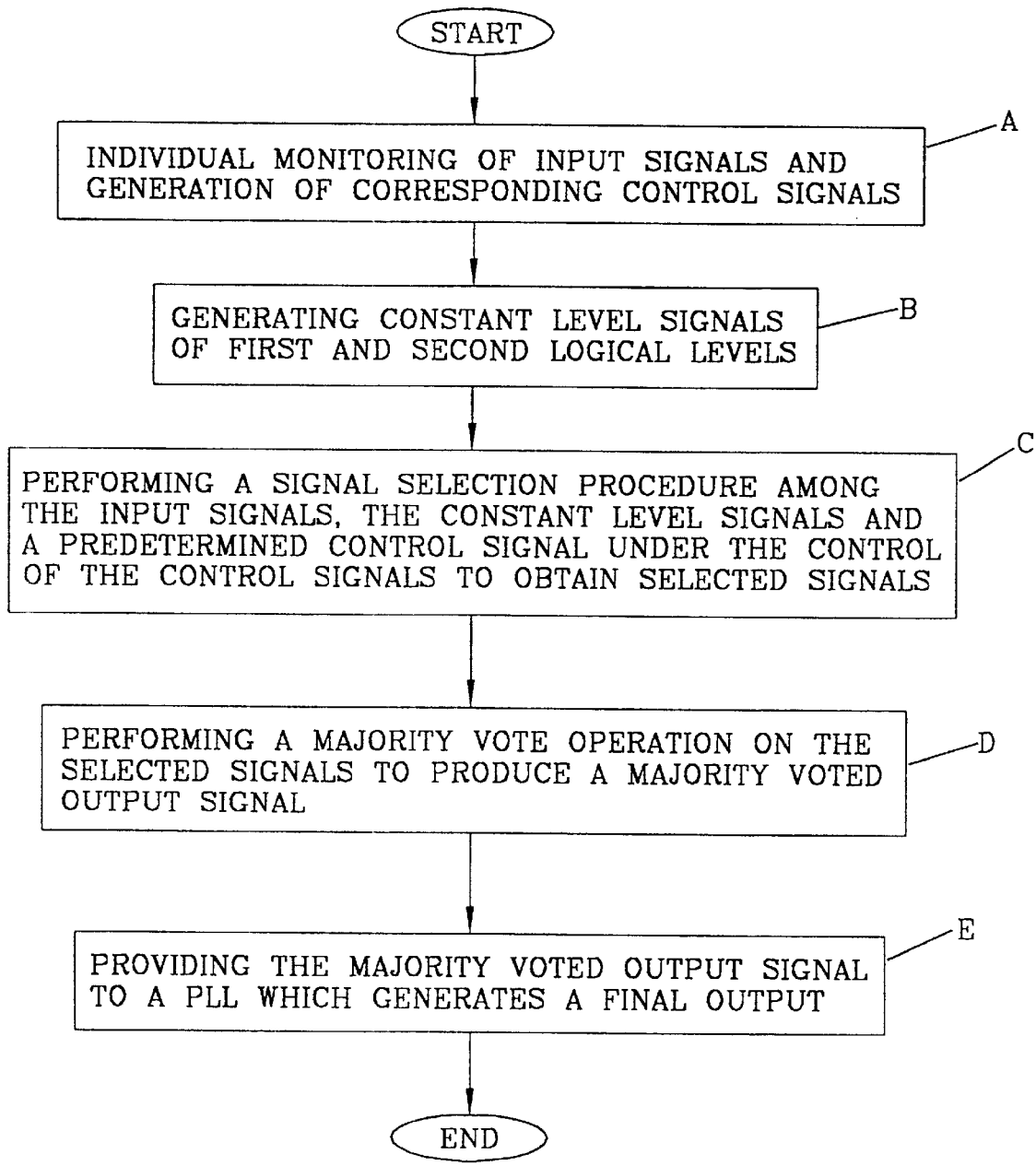
FIG. 5 is a schematic flow diagram of a method for majority voting according to the invention.

FIG. 5 is a schematic flow diagram of a method for majority voting according to the invention. The method relates to majority voting of at least three logical input signals in order to produce a majority voted output signal. Preferably, the input signals are periodic signals such as clock signals. In step A, the input signals are monitored individually to generate, for each one of the logical input signals, a corresponding control signal which is representative of the status of the logical input signal. Advantageously, the input signals are monitored by continuously checking the signal period time. If, as an example, the absence of a predetermined number of pulses in an input signal is detected, the corresponding control signal is set to the predetermined level of "1". As a consequence, a control signal having the logical level of "0" will represent a correct and well-defined input signal. In step B, there is generated a first constant level signal of a first predetermined logical level, and a second constant level signal of a second predetermined logical level. Next, in step C, a selection procedure is performed by:

selecting one of a first logical input signal and the first constant level signal as a first selected signal in dependence on the control signal that corresponds to the first input signal;

selecting one of a second logical input signal and the second constant level signal as a second selected signal in dependence on the control signal that corresponds to the second input signal; and selecting one of a third logical input signal and a predetermined one of the control signals as a third selected signal in dependence the control signal that corresponds to the third input signal. Preferably, the first constant level signal is high, and the second constant level signal is low, and the predetermined control signal used in the step of selecting the third selected signal is the control signal that corresponds to the second logical input signal. In step D, a majority vote operation is performed on the first, second and third selected signals to produce the majority voted output signal. Preferably, in step E, the majority voted output signal is provided to a phase-locked loop (PLL) which generates a final output signal.

Maintenance of the majority voting functionality

Another aspect of the invention relates to maintenance, supervision and testing of the improved majority voting functionality.

Testing of majority votes has been performed on simple non-correcting majority voting circuits in the prior art.

U.S. Pat. No. 5,305,325 issued to Roos on Apr. 19, 1994 relates to a method and device for testing and supervising majority votes in a multiplane digital time selector with at least three identical planes of equipment. Each one of the planes delivers an outgoing datastream. These datastreams are received by a majority vote circuit and subjected to a majority vote operation therein. An error is deliberately introduced in accordance with a predetermined pattern into the data streams to be majority voted. The datastreams are then compared to the majority voted data stream, and an alarm is emitted as a result of this comparison if an error is found in any of the datastreams coming to the majority vote circuit. An expected alarm caused by a deliberately introduced error is identified in order to distinguish from alarms caused by other errors.

The maintenance strategy according to the invention is to use a mix of preventive and corrective maintenance to maintain a high degree of in-service performance. As a result of this maintenance strategy, as much functionality as possible should be supervised by the maintenance system. The clock and synchronization signals in particular are extremely vital for the switch system as well as for the whole digital telephone network synchronization. Consequently, it must be possible to check that the majority vote logic and its associated control logic are working.

In accordance with the invention, a disturbance, in the form of a missing clock pulse in the resulting majority voted clock signal CP1_MV, is produced by stopping two of the clock signals CP1_x. Furthermore, there is provided a majority vote clock monitor 18 (FIG. 1) which receives the majority voted clock signal CP1_MV and the CLK4 signal from the PLL divider 17. The CP1_MV clock and the CLK4 clock are compared to each other, and an alarm is selectively generated in dependence on the result of the comparison. The majority vote clock monitor 18 should be able to detect the provoked disturbance so that a majority vote alarm, also referred to as CPMF alarm, is generated. This requirement is met by stopping the clocks, one at a time, according to a predetermined first procedure.

It is important to understand that the majority vote clock monitor must be fast enough to catch the missing clock pulse, before the majority voter 14 and its associated control logic 12A–C, 13 restore the majority voted clock In other words, the majority vote clock monitor 18 has to react faster than the clock monitors 12A–C that control the level control unit 13. On the other hand, the clock monitors 12A–C and the level control unit 13 have to be so fast that the output signal of the phase-locked loop 15 is not influenced by the produced disturbance. In other words, the disturbance must be removed by the filter of the phase-locked loop 15. This is yet another reason for having a PLL 15 connected to the output of the majority voter 14. The PLL takes care of the missing clock pulse produced in testing the majority vote hardware, such that tests can be performed without causing disturbances. This is a clear advantage. Testing can be performed even on a routine basis without disturbing the system.

It is however also desirable that other normal maintenance actions, such as a change of clock module, should be possible to perform without getting undesired majority vote alarms which will increment fault counters in the maintenance system. Therefore, it should be possible to stop one or two clocks without getting a majority vote alarm. This requirement is met by stopping the clocks according to a predetermined second procedure, which differs from the predetermined first procedure.

Figure 6:
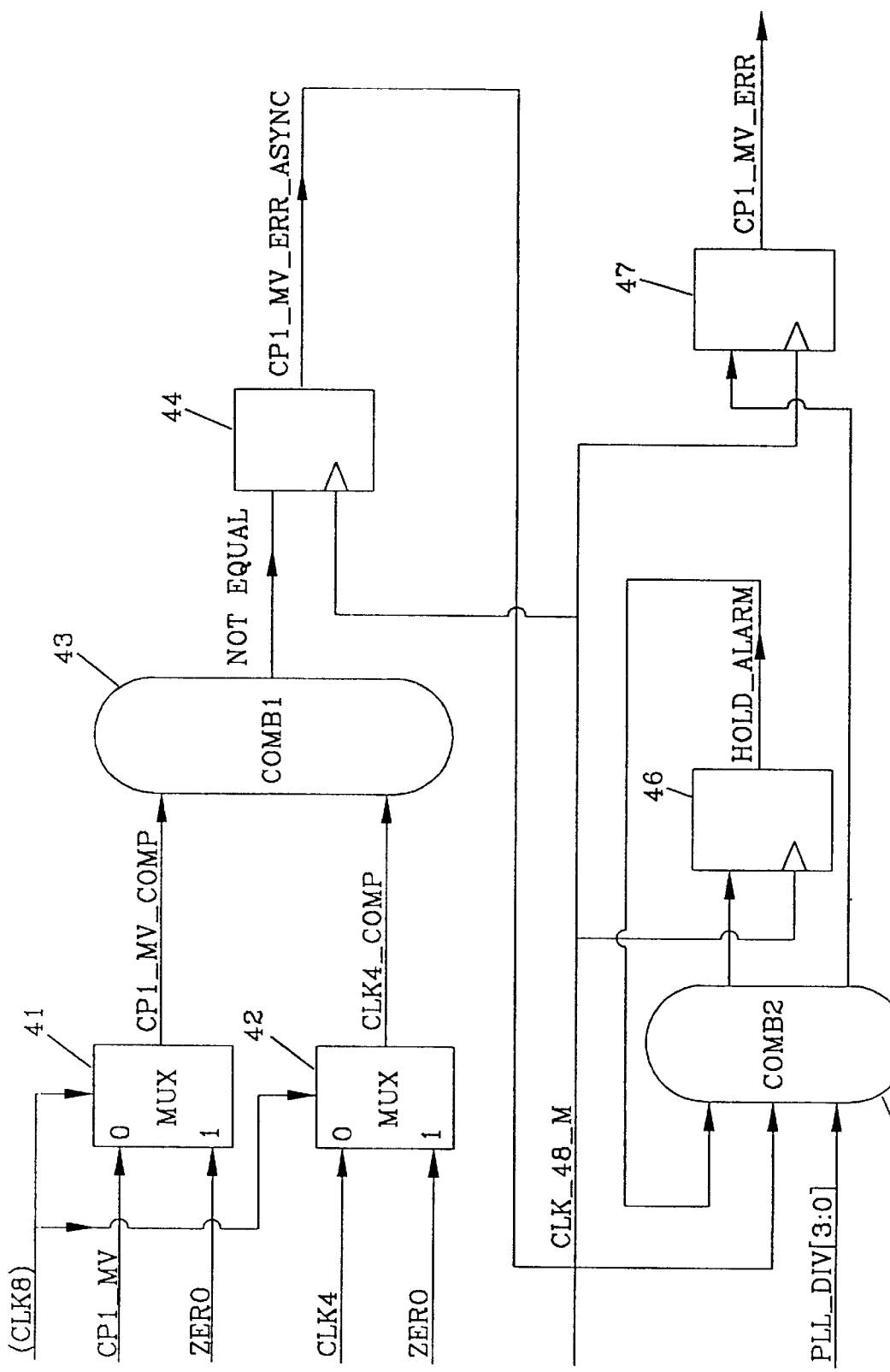
FIG. 6 is a schematic circuit diagram of a monitor for the majority voted clock, according to the invention.

FIG. 6 is a schematic circuit diagram illustrating a monitor for the majority voted clock signal in detail. The majority vote clock monitor 18 (FIG. 1) comprises multiplexers 41, 42, a first combinatorial network 43, a flip-flop 44, a second combinatorial network 45, and flip-flops 46, 47. The flip-flops 44, 46 and 47 are all clocked by the 48 MHz CLK_48_M clock signal. The majority vote clock monitor 18 compares the majority voted clock signal CP1_MV with the 4 MHz CLK4 clock signal produced by the PLL divider 17, and generates an alarm if there is a phase difference of 20 ns or more between the signals. In other words, an alarm is generated if the PLL is 20 ns out of phase, compared to the normal 90 degrees phase relation to the CP1_MV clock signal when the PLL is locked. As the CLK4_90 signal, also produced by PLL divider 17, is generated by the positive edge of the 48 MHz clock signal CLK_48, the majority voted clock signal CP1_MV will change level very close to the positive edge of this clock signal when the PLL 15 is in a locked state. For this reason, the CP1_MV clock is not checked when it is expected to change level, and the multiplexer 41 is utilized to set CP1_MV to a defined value (not active) during this 48 MHz clock period. The output signal of the multiplexer 41 is referred to as CP1_MV_COMP. In practice this means that the value and phase of CP1_MV is checked 10 out of 12 48 MHz clock periods. Correspondingly, the CLK4 signal is sent to a multiplexer 42 to generate the signal CLK4_COMP. The CLK4_COMP signal and the CP1_MV_COMP signal are sent to the first combinatorial network 43 which checks if these signals differ from each other. If everything is all right, then they are expected to be equal, otherwise the alarm should be set. If they differ from each other, a signal NOT_EQUAL is set high.

When set, the alarm may be asynchronous since the phase relation might change during certain conditions, e.g. when a clock signal stops, or when the PLL 15 is faulty and/or not locked. In order to avoid that metastability is spread outside the module, the NOT_EQUAL signal is sent to the meta stability protection flip-flop 44 which takes care of possible meta stability, and produces the signal CP1_MV_ERR_ASYNC. The second combinatorial network 45 receives the CP1_MV_ERR_ASYNC signal, a 4-bit PLL_DIV signal from the PLL divider 17, and an output signal HOLD_ALARM of the flip-flop 46. The HOLD_ALARM signal from the flip-flop 46 is provided to the second combinatorial network 45 in a feedback loop. The combinatorial network 45 generates two output signals, one of which is sent to the flip-flop 46, and one of which is sent to the flip-flop 47 to generate the stable alarm signal CP1_MV_ERR.

Preferably, the first combinatorial network 43 and the second combinatorial network 45 are implemented by using the programming language VERILOG and the synthesizing program SYNOPSYS.

In order to be able to meet the requirement that two of the clock signals should be able to stop without getting a majority vote alarm, the CP1_1ERR control signal must be reclocked into the CLK_48 MHz clock system before it is utilized to control one of the selectors in the level control unit 13 (FIG. 1).

Figure 7A:
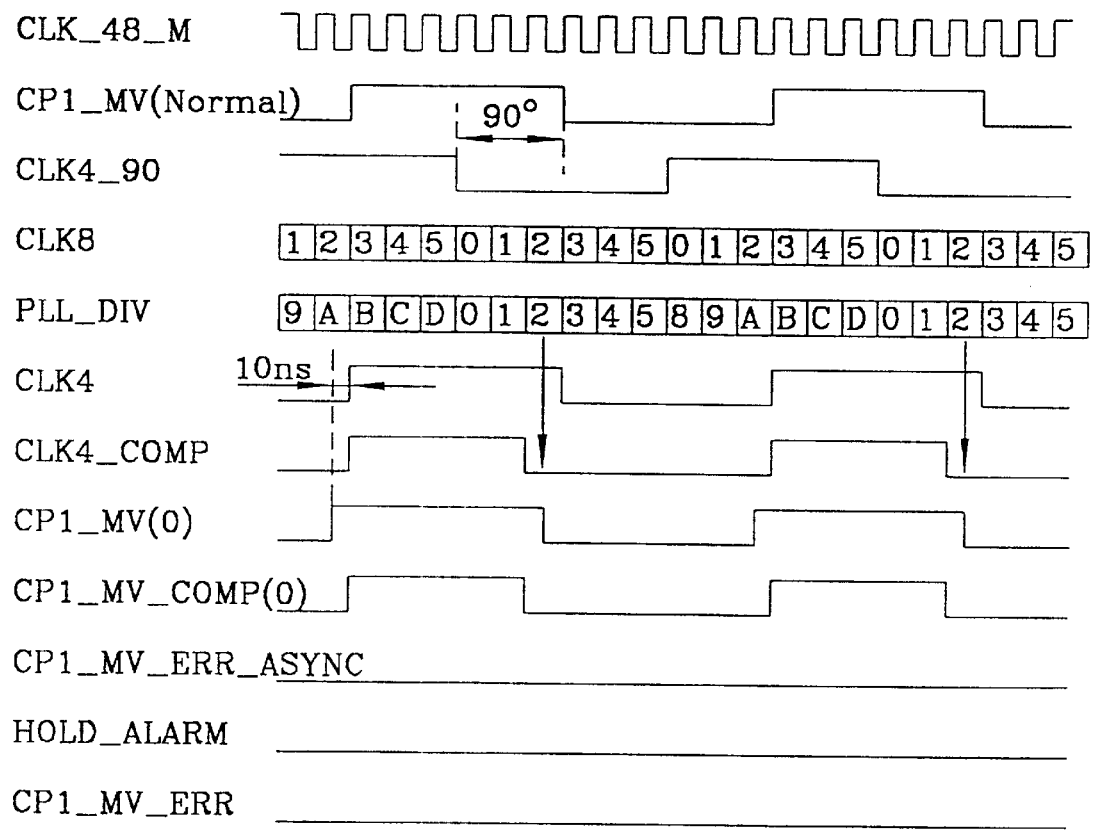
FIGS. 7A–C are schematic timing diagrams of signals involved in the operation of the majority voted clock monitor of FIG. 6 when the majority voted clock signal is out of phase.
Figure 7B:
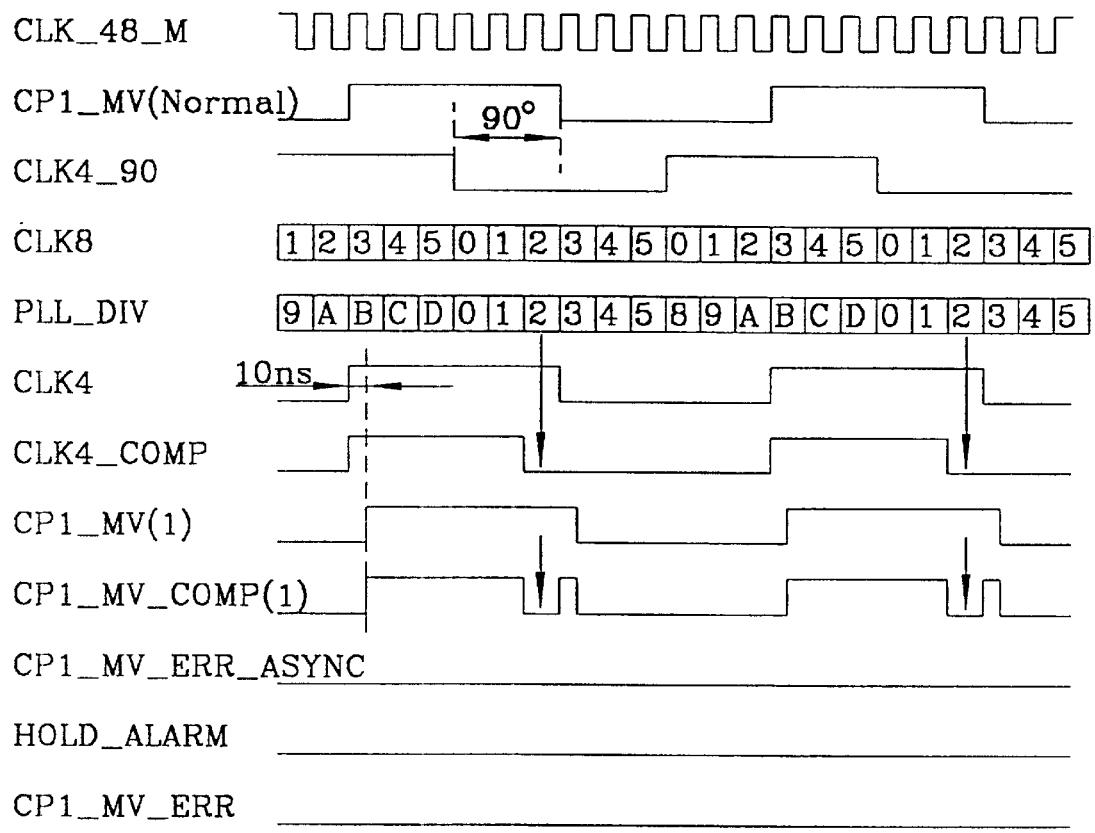
Figure 7C:
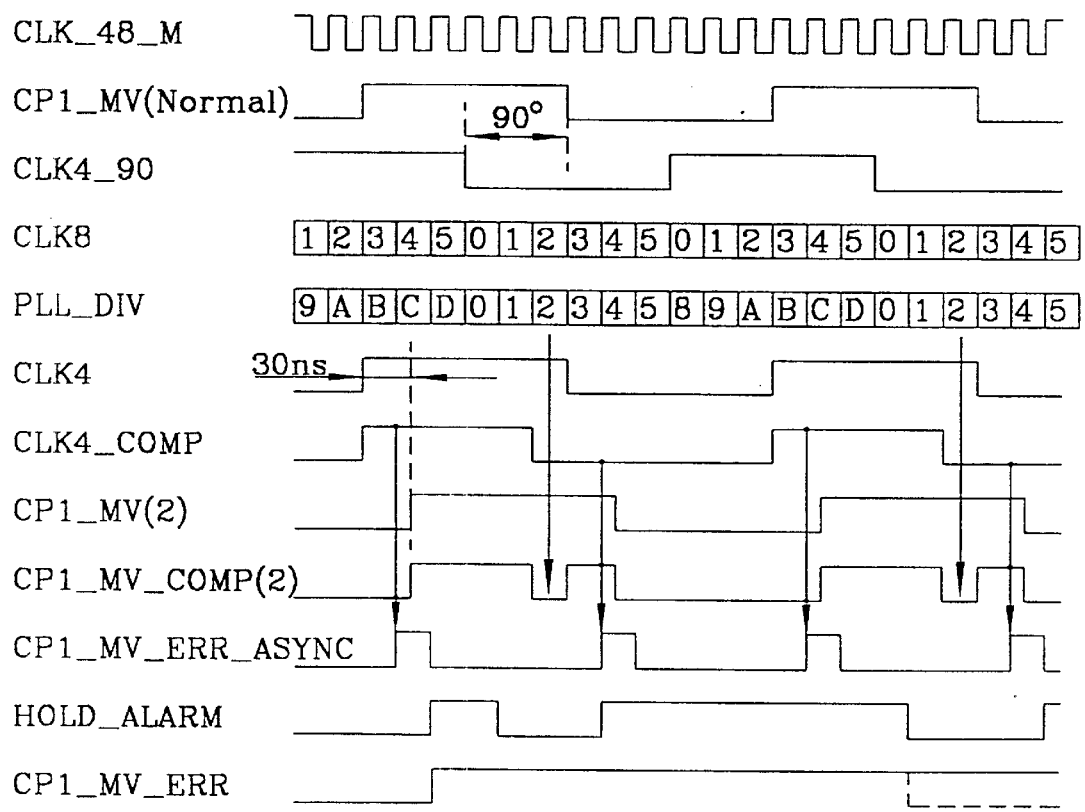

FIGS. 7A–C are schematic timing diagrams of signals involved in the operation of the majority voted clock monitor of FIG. 6 when the majority voted clock signal is out of phase. In FIG. 7A, the CP1_MV(0) signal is 10 ns earlier than the CLK4 signal. In FIG. 7B, CP1_MV(1) is 10 ns later than CLK4, and in FIG. 7C, CP1_MV(2) is 30 ns later than CLK4. The CP1_MV signal is referred to as CP1_MV(x) where x is 0, 1 or 2 to distinguish the different cases from each other. The alarm CP1_MV_ERR, also referred to as CPMF in FIG. 1, is generated by CP1_MV(2) as illustrated in FIG. 7C. In this example, as indicated in FIG. 7C, the minimum duration of the CP1_MV_ERR alarm is one 4 MHz cycle.

To get a majority vote alarm, follow the first procedure given below:

First stop any of the clocks CP1_0, CP1_1 or CP1_2. It does not matter if it is stopped low or high. Then, stop the next clock high if CP1_0 has been previously stopped, else, if CP1_1 or CP1_2 has been stopped, stop the next clock low.

To avoid a majority vote alarm, follow the second procedure given below:

First stop any of the clocks CP1_0, CP1_1 or CP1_2. It does not matter if it is stopped low or high. Then, stop the next clock low if CP1_0 has been previously stopped, else, if CP1_1 or CP1_2 has been stopped, stop the next clock high.

The above procedures of stopping the clocks are preferably software controlled, and the software is executed in a processor. In the following, an illustrative example of how to perform a software controlled clock majority vote test is given in Table 1.

TABLE 1

Software majority vote test

| Configuration | CP1_0 | CP1_1 | CP1_2 |
|---|---|---|---|
| Normal | Pulse | Pulse | Pulse |
| 1 ongoing | Low | Pulse | Pulse |
| 1 | Low | High | Pulse |
| 2 ongoing | Low | Pulse | Pulse |
| 2 | Low | Pulse | High |
| 3 ongoing | Pulse | Pulse | High |
| 3 | Pulse | Low | High |
| Normal ongoing | Pulse | Low | Pulse |
| Normal | Pulse | Pulse | Pulse |

The term 'Pulse' indicates that the clock is working normally, whereas the terms 'Low' and 'High' indicate that the clock has stopped at a low level and a high level, respectively.

The results of the software test in the configurations labeled 1, 2 and 3 in table 1 are given in Table 2 below.

TABLE 2

Result of majority vote test

| Configuration | CSF_0 | CSF_1 | CSF_2 | CPMF |
|---|---|---|---|---|
| 1 | Alarm | Alarm | — | Alarm |
| 2 | Alarm | — | Alarm | Alarm |
| 3 | — | Alarm | Alarm | Alarm |

CSF_x (x is 0, 1 or 2) denotes the control signal CP1_xERR when it is acting as an alarm signal, and CPMF denotes the majority vote alarm. The CSF_x (CP1_xERR) signals are generated by the clock monitors 12A–C.

In table 3 below, an illustrative example of how to stop two clocks without getting a majority vote alarm is given.

TABLE 3

Majority vote alarm avoidance

| Configuration | CP1_0 | CP1_1 | CP1_2 |
|---|---|---|---|
| Normal | Pulse | Pulse | Pulse |
| Stop first clock | Low | Pulse | Pulse |
| Stop second clock | Low | Low | Pulse |
| Back to normal | Low | Pulse | Pulse |
| Normal | Pulse | Pulse | Pulse |

Figure 8:
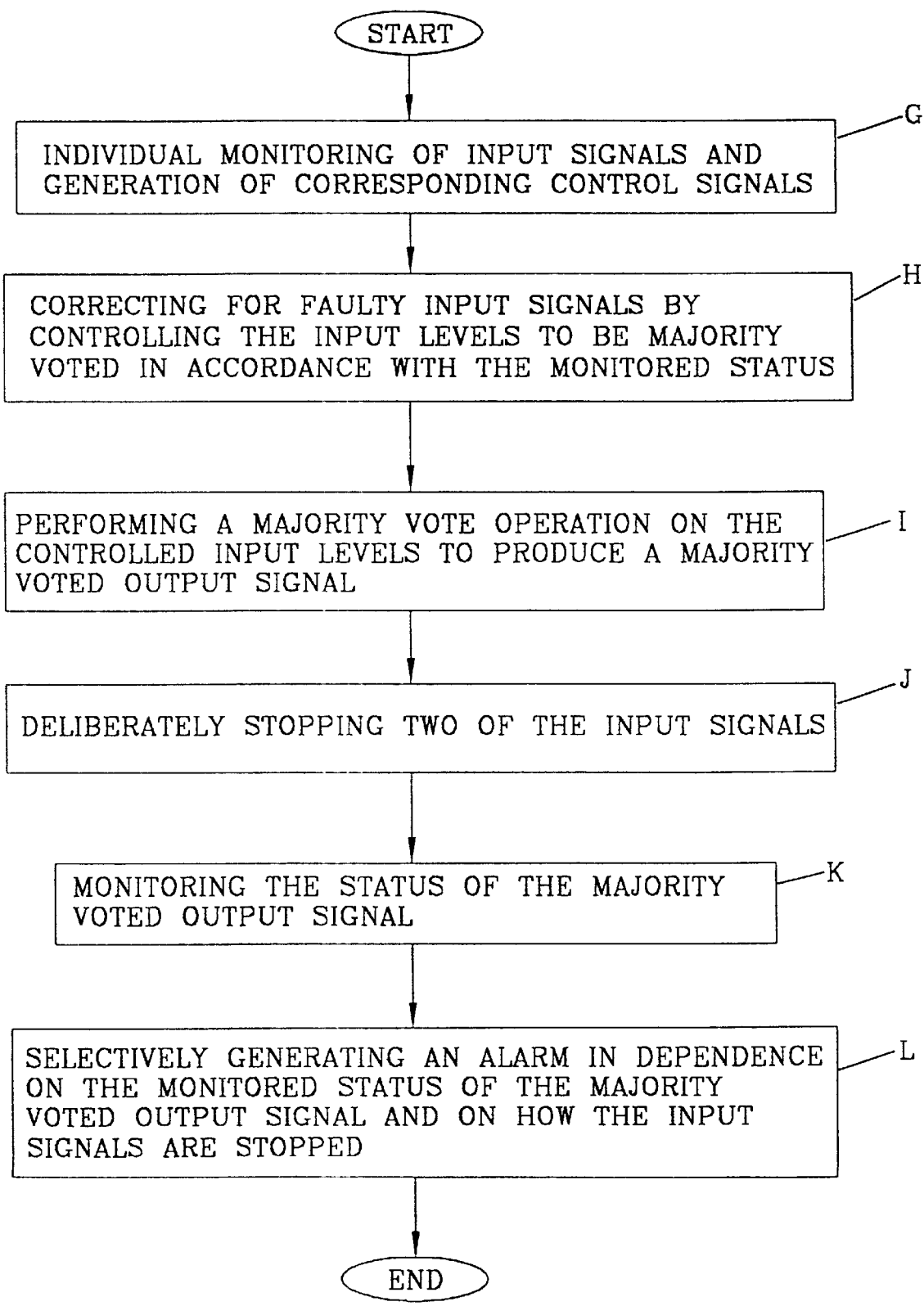
FIG. 8 is a schematic flow diagram of a method for testing the majority vote functionality of a correcting majority voting circuit.

FIG. 8 is a schematic flow diagram of a method for testing majority voting of a number of input signals. In step G, the logical input signals are monitored individually to generate, for each one of the logical input signals, a corresponding control signal which is representative of the status of the logical input signal. In step H, faulty input signals are corrected for by controlling the input levels to be majority voted in accordance with the monitored status. In step I, a majority vote operation is performed on the controlled input levels to produce a majority voted output signal. In step J, two of the input signals are stopped deliberately, one input signal at a time. In step K, the status of the majority voted output signal is monitored. In step L, an alarm is selectively generated in dependence on the monitored status of the majority voted output signal. If the step J of deliberately stopping the input signals is performed according to a first predetermined procedure, then an erroneous majority voted output signal caused by the deliberately stopped input signals is detected before the deliberately stopped input signals are corrected, and an alarm is generated in response to the detection. If, however, the step J of deliberately stopping the input signals is performed according to a second predetermined procedure, then an alarm is avoided. Preferably, the majority voted output signal is provided to a phase-locked loop (PLL) that generates a feedback signal, and the status of the majority voted output signal is monitored by comparing the majority voted signal to the feedback signal of the PLL.

Preferably, the method illustrated in the flow diagram of FIG. 8 is implemented by using the improved majority voting hardware design described above in connection with FIGS. 1 to 4, and the majority vote clock monitor of FIG. 6.

The embodiments described above are merely given as examples, and it should be understood that the present invention is not limited thereto. It is of course possible to embody the invention in specific forms other than those described without departing from the spirit of the invention. For example, it should be apparent that the system could be designed to work with any conventional phase-locked loop known to the art, and that the clock monitors and the majority vote clock monitor could be designed in a different manner. Further modifications and improvements which retain the basic underlying principles disclosed and claimed herein are within the scope and spirit of the invention.

What is claimed is:

1. A method for insitu testing of a multi-fault tolerant majority voting operation of a number of logical input signals, comprising the steps of:

monitoring the logical input signals individually to generate, for each one of the logical input signals, a corresponding control signal which is representative of the status of the logical input signal;

correcting for one or more faulty logical input signals in accordance with said monitored status by controlling the input levels to be majority voted;

performing a majority vote operation on said controlled input levels to produce a majority voted output signal;

deliberately stopping two of the logical input signals, one input signal at a time;

monitoring the status of the majority voted output signal; and selectively generating an alarm in dependence on the monitored status of the majority voted output signal such that if said step of deliberately stopping the input signals is performed according to a first predetermined procedure, then an erroneous majority voted output signal caused by said deliberately stopped input signals is detected before said deliberately stopped input signals are corrected for, and said alarm is generated in response to said detection, whereby the majority voting operation is capable of being tested while still producing a validly majority voted output signal of the logical input signals.

2. The method according to claim 1, wherein said alarm is avoided if said step of deliberately stopping the input signals is performed according to a second predetermined procedure.

3. The method for testing majority voting according to claim 1, further comprising the steps of providing the majority voted output signal to a phase-locked loop which generates a feedback signal, and wherein said step of monitoring the status of the majority voted output signal comprises the step of comparing the majority voted output signal to said feedback signal.

4. A device for insitu testing of a multi-fault tolerant majority voting operation of a number of logical input signals, said device comprising:

signal monitors, each of which is operable for monitoring a respective one of the logical input signals for generating a corresponding control signal representing the status of the logical input signal;

means for correcting for one or more faulty logical input signals in accordance with said monitored status by controlling the input levels to be majority voted;

a majority voter for performing a majority vote operation on said controlled input levels to produce a majority voted output signal;

means for deliberately stopping two of the logical input signals, one input signal at a time, according to a first predetermined procedure; and a monitor circuit for monitoring the status of the majority voted output signal, and for detecting an erroneous majority voted output signal that is caused by said deliberately stopped input signals, before said deliberately stopped input signals are corrected for, so as to generate an alarm in response thereto, whereby the majority voting operation is capable of being tested while still producing a validly majority voted output signal of the logical input signals.

5. The device for testing according to claim 4, further comprising a phase-locked loop (PLL) which is responsive to the majority voted output signal for generating a feedback signal, and wherein said monitor circuit monitors the status of the majority voted output signal by comparing it to said feedback signal.

6. The device for testing according to claim 4, further comprising:
   means for deliberately stopping two of the logical input signals, one logical input signal at a time, according to a second predetermined procedure to avoid the generation of said alarm.

* * * * *